(12) United States Patent
Taguchi et al.

(10) Patent No.: US 7,665,102 B2
(45) Date of Patent: Feb. 16, 2010

(54) HEAT-ASSISTED MAGNETIC RECORDING METHOD AND TEST RECORD REPRODUCTION METHOD

(75) Inventors: Jun Taguchi, Kawasaki (JP); Koji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 11/218,118

(22) Filed: Sep. 1, 2005

(65) Prior Publication Data

US 2006/0117333 A1 Jun. 1, 2006

(30) Foreign Application Priority Data

Nov. 30, 2004 (JP) .............. 2004-346964

(51) Int. Cl.
*G11B 7/00* (2006.01)

(52) U.S. Cl. ..................... 720/659

(58) Field of Classification Search ........... None
See application file for complete search history.

(56) References Cited

U.S. PATENT DOCUMENTS

| | | | | |
|---|---|---|---|---|
| 4,633,450 A | * | 12/1986 | Gueugnon | 369/13.32 |
| 5,105,408 A | * | 4/1992 | Lee et al. | 369/44.15 |
| 5,161,134 A | * | 11/1992 | Lee | 369/13.32 |
| 5,197,050 A | * | 3/1993 | Murakami et al. | 369/13.13 |
| 5,406,539 A | * | 4/1995 | Paeng et al. | 369/59.12 |
| 2006/0187564 A1 | * | 8/2006 | Sato et al. | 360/59 |

FOREIGN PATENT DOCUMENTS

| | | |
|---|---|---|
| JP | 06-243527 | 9/1994 |
| JP | 2003-157502 | 5/2003 |

* cited by examiner

*Primary Examiner*—David D Davis
(74) *Attorney, Agent, or Firm*—Greer, Burns & Crain, Ltd.

(57) ABSTRACT

A heat-assisted magnetic recording method is provided for implementing information recording on a recording magnetic film of a magnetic recording medium rotated around a rotation center. The method includes the steps of: illuminating a recording region in the magnetic film with a laser beam for locally heating the recording region; and applying a recording magnetic field to the heated recording region. The power of the laser beam illuminating the recording region is selected in accordance with the distance between the rotation center and the recording region.

3 Claims, 8 Drawing Sheets

FIG.3

| Zone | Zone Range | Laser Power |
|---|---|---|
| $Z_1$ | 10~12mm | $P_1$ |
| $Z_2$ | 12~14mm | $P_2$ |
| $Z_3$ | 14~16mm | $P_3$ |
| $Z_4$ | 16~18mm | $P_4$ |
| $Z_5$ | 18~20mm | $P_5$ |
| $Z_6$ | 20~22mm | $P_6$ |
| $Z_7$ | 22~24mm | $P_7$ |
| $Z_8$ | 24~26mm | $P_8$ |
| $Z_9$ | 26~28mm | $P_9$ |
| $Z_{10}$ | 28~30mm | $P_{10}$ |

HEAT-ASSISTED MAGNETIC RECORDING METHOD AND TEST RECORD REPRODUCTION METHOD

BACKGROUND OF THE INVENTION

1. Field of the Invention

The present invention relates to a magnetic recording method for heat-assisted recording of information on a magnetic recording medium. The present invention also relates to a test record reproduction method for determining the recording conditions that will be employed in the heat-assisted magnetic recording method.

2. Description of the Related Art

Magnetic recording media (magnetic disks) are known as recording media for constituting recording devices such as hard disks. The increase in the information processing volume in computer systems creates a growing demand for magnetic disks with increased recording density.

When information is recorded on a magnetic disk, a magnetic head for recording is disposed close to the recording surface (composed of a recording magnetic film) of the magnetic disk, and a recording magnetic field with intensity higher than the coercive force of the recording magnetic film is applied to the recording magnetic film with the magnetic head. When the direction of the recording magnetic field from the magnetic head is successively inverted, while the magnetic head is being moved with respect to the magnetic disk, a plurality of magnetic domains (recording marks) with successively inverted magnetization direction are formed in a row in the circumferential direction of the magnetic disk or in the track extension direction in the recording magnetic film. At this time, the recording marks with prescribed individual length are formed by controlling the timing at which the direction of the magnetic recording field is inverted. The prescribed signals or information are thus recorded as changes in the magnetization direction in the recording magnetic film.

In the technological field of magnetic disks, it is well known that the larger is the coercive force of the recording magnetic film, the higher is the thermal stability of magnetic domains formed in the recording magnetic film and the easier is the formation of stable magnetic domains of a very small size or width. The smaller are the smallest magnetic domains that can be formed with good stability in the recording magnetic film, the higher is the recording density that can be obtained in the magnetic disk.

In information recording on magnetic disks, as mentioned hereinabove, recording marks cannot be adequately formed unless the recording magnetic field applied to the recording magnetic film is higher than the coercive force thereof. For this reason, the intensity of the recording magnetic field that has to be applied by the magnetic head apparently has to increase with the increase in the coercive force that is set for the recording magnetic film. However, the intensity of the recording magnetic field that can be applied by the magnetic head is limited, for example, from the standpoint of magnetic head structure or power consumption.

Accordingly, the so-called heat-assisted magnetic recording method is sometimes used for information recording on the magnetic disks. When information recording on magnetic disks is implemented by employing the heat-assisted magnetic recording method, first, the temperature of the recording magnetic film of the magnetic disk is locally and successively raised by conducting laser beam illumination from the prescribed optical head disposed in the vicinity of the recording surface of the rotating magnetic disk. In the area with the raised temperature in the recording magnetic film, the coercive force decreases with respect to that in the surrounding areas where the temperature has not been increased. Then, a recording magnetic field that is stronger than the coercive force in the area of the recording magnetic field with the increased temperature is applied to the area with the increased temperature by the magnetic head disposed in the vicinity of the recording surface of the magnetic disk, and part of the area with increased temperature is magnetized in the prescribed direction. This magnetization is fixed in the process of cooling the magnetized zone. With the heat-assisted magnetic recording method, recording marks magnetized in the prescribed direction are thus formed. If the heat-assisted magnetic recording method is used, information recording is implemented by applying the recording magnetic field to the zones in which the coercive force was decreased by heating. Therefore, even when the coercive force of a recording magnetic film at a normal temperature during information storage or information reproduction is set at a high level, it is not necessary to increase excessively the intensity of the recording magnetic field that has to be applied with the magnetic head. Such a heat-assisted magnetic recording method is described, for example, in Japanese Patent Applications Laid-open No. H6-243527 and 2003-157502.

With the conventional heat-assisted magnetic recording method, the rotation speed of magnetic disk is set to a constant value and the power of the illuminated laser beam is also set to a constant value. Because the rotation speed of the magnetic disk is constant, the linear speed of each zone in the recording surface of the magnetic disk during information recording changes according to the distance from the rotation center.

More specifically, the linear speed is lower in zones closer to the rotation center. The laser beam illumination interval (heating interval) of the region is longer in the zones with a low linear speed (zones close to the rotation center). Therefore, the energy of temperature increase that is received per unit time is larger in the zones with a low linear speed. Moreover, the cooling efficiency resulting from the rotation of the magnetic disk is lower in zones with a low linear speed.

Therefore, with the conventional heat-assisted magnetic recording method, the maximum attained temperature (the highest temperature in the temperature increase area attained by laser beam illumination) is higher and the range of temperature increase above the prescribed temperature is wider under laser beam illumination in the zones of the recording surface where the linear speed is low, that is, the zones close to the rotation center. Therefore, with the conventional heat-assisted magnetic recording method, the maximum attained temperature in the temperature increase area during the formation of recording marks in the zones on the outermost periphery (that is, zones with the lowest heating efficiency), which is the farthest from the rotation center, on the recording surface is correspondingly different from the maximum attained temperature in the temperature increase area during the formation of recording marks in the zones on the innermost periphery (that is, zones with the highest heating efficiency), which is the closest to the rotation center, on the recording surface.

Futher, the width of the temperature increase range above the prescribed temperature during the formation of the recording marks in the zones on the outermost periphery of the recording surface differs correspondingly from the width of the temperature increase range above the prescribed temperature during the formation of the recording marks in the zones on the innermost periphery. With such a conventional heat-assisted magnetic recording method, when the illumination laser power is set to an intensity at which recording marks can be formed in the zones on the outermost periphery of the recording surface, during information recording on the inner peripheral side of the recording surface, the illumination laser power becomes too high. As a result, in some cases the maximum attained temperature of the recording magnetic film increased by laser beam illumination becomes inappropriately high and the temperature increase range above the prescribed temperature becomes inappropriately wide.

In the heat-assisted magnetic recording method in which recording marks are successively formed along the tracks of the recording magnetic field by laser beam illumination of the recording magnetic field and application of the recording magnetic field thereto, if the maximum attained temperature is too high, the coercive force in the formation of the recording marks that were formed immediately before this event drops inappropriately, sometimes causing the recording demagnetization effect, that is, loss or degradation of the recording marks formed immediately before this event under the effect of the recording magnetic field. The recording demagnetization effect is undesirable because it decreases the SNR (Signal to Noise Ratio) in the reproduced signals during magnetic disk reproduction and impedes the increase in magnetic recording density of the magnetic disk. Furthermore, if the temperature increase range above the prescribed temperature is too wide, the recording mark width inappropriately increases, reaching the track adjacent to the track where the recording marks have been successively formed and sometimes causing the cross-write effect, that is, loss or degradation of recording marks on the adjacent tracks. The cross-write effect is undesirable from the standpoint of increasing the recording density of magnetic disk because it hinders the decrease in the pitch between the tracks. Thus, the conventional heat-assisted magnetic recording method in which the illumination laser power which is so set that the recording marks can be formed in the zones on the outermost periphery of the recording surface is employed during information recording on the inner peripheral side of the recording surface impedes the increase in recording density.

SUMMARY OF THE INVENTION

With the foregoing in view, it is an object of the present invention to provide a heat-assisted magnetic recording method suitable for increasing the recording density on a magnetic recording medium and a test record reproduction method for determining a plurality of laser power conditions to be used by this heat-assisted magnetic recording method.

The present invention, in accordance with the first aspect thereof, provides a heat-assisted magnetic recording method. This method is designed for implementing information recording on a magnetic recording medium, which comprises a recording magnetic film and is rotated around a rotation center, by illuminating the recording magnetic-film with a laser beam and locally and successively rising the temperature of the recording magnetic film and at the same time applying a recording magnetic field to the heated area. Further, with the present method, the recording magnetic film is illuminated with the laser beam by selecting a laser power according to the distance from the rotation center to the zone (zone predetermined for laser beam illumination) in the recording magnetic film that is to be illuminated with the laser beam.

With the present heat-assisted magnetic recording method, laser illumination is conducted by selecting the appropriate laser power according to the distance from the rotation center to the zone predetermined for laser beam illumination (zone predetermined for recording mark formation) in the recording magnetic film, thereby making it possible to adjust adequately the maximum attained temperature of the heated area of the recording magnetic film and also to adjust adequately the temperature increase range above the prescribed temperature.

For example, when the recording marks are formed in the zone on the outermost periphery with the highest linear speed and farthest from the rotation center in the recording magnetic film, the laser beam illumination is conducted by selecting the highest laser power (first laser power). On the other hand, when the recording marks are formed in the zones on the innermost periphery with the lowest linear rate and closest to the rotation center in the recording magnetic film, the light beam illumination is conducted by selecting the lowest laser power (second laser power). When the recording marks are formed in other zones, the light beam illumination is conducted by selecting the laser power between the first and second laser powers.

With the above arrangements, the difference in the maximum attained temperature in the temperature increase areas of the recording magnetic film during information recording can be inhibited and uniform maximum attained temperature can be obtained and also the difference in the width of the temperature increase range above the prescribed temperature can be inhibited and a uniform width of the temperature increase range can be obtained from the zones on the outermost periphery to the zones on the innermost periphery of the recording magnetic film. Obtaining a uniform maximum attained temperature at a level of an adequate temperature makes it possible to avoid or sufficiently inhibit the above-described recording demagnetization effect caused by the inappropriate increase in the maximum attained temperature.

Moreover, obtaining a uniform temperature increase range above the prescribed temperature at an adequate width level makes it possible to avoid or sufficiently inhibit the above-described cross-write effect caused by the inappropriate widening of the temperature increase range above the prescribed temperature. Therefore, with this heat-assisted magnetic recording method, the recording marks can be adequately formed, while avoiding or sufficiently inhibiting the recording demagnetization effect or cross-write effect. Such a heat-assisted magnetic recording method is suitable for increasing the density of recording on magnetic recording media.

The present invention, in accordance with the second aspect thereof, provides a heat-assisted magnetic recording method. This method is designed for implementing information recording on a magnetic recording medium, which comprises a recording magnetic film and is rotated around a rotation center, by illuminating the recording magnetic film with a laser beam and locally and successively rising the temperature of the recording magnetic film and at the same time applying a recording magnetic field to the temperature increase area. Further, with the present method, the recording magnetic film comprises a plurality of concentric annular areas having the rotation center as a common axis, and the recording magnetic film is illuminated with the laser beam by selecting a laser power depending on which annular area the heated recording region belongs to.

The present invention, in accordance with the third aspect thereof, provides a test record reproduction method. This method comprises a test recording process and a subsequent reproduction process. In the test recording process a first recording mark group is formed along a first track in a recording magnetic film, a second recording mark group is formed along a second track adjacent to the first track, and a third recording mark group is formed along a third track adjacent to the first track on the side opposite to that of the second track by rotating a magnetic recording medium around a rotation center, illuminating the recording magnetic film with a laser beam and locally and successively rising the temperature of the recording magnetic film and at the same time applying a recording magnetic field to the heated area. In the reproduction process, the magnetic signals originating in the first recording mark group formed in the first track are measured. Further, in this method, a plurality of linear speeds are set with respect to the first track in the test recording step, a plurality of laser powers are set for each linear speed with respect to the laser beam illuminating the recording magnetic film in the test recording process, and the test recording process and the reproduction process are implemented for all the combinations of a plurality of linear speeds and a plurality of laser powers.

In the test recording step of the present method, a constant linear speed of the first track is maintained and a constant power of laser beam illumination on the recording magnetic film is maintained during the formation of the first to third recording mark groups on each of the first to third tracks. In the reproduction process, when signals originating in the first recording mark group formed in the first track are measured, for example, a bit error rate (bER) or reproduction signal amplitude in reproduction can be found based on the magnetic signal measurements. Implementing such test recording step and subsequent reproduction step with respect to the entire laser power that is set for each linear speed under the same first track linear speed conditions makes it possible to determine an optimum laser power for which a minimum bER or maximum reproduction signal amplitude is obtained under those linear speed conditions. A minimum bER or maximum reproduction signal amplitude means that the recording demagnetization effect and/or cross-write effect is most effectively inhibited under such linear rate conditions. Further, conducting such a determination of the optimum laser powder under the identical linear speed conditions with respect to all the linear speeds that will be set makes it possible to determine a set of optimum laser powers corresponding to a plurality of linear speeds that will be set. As described hereinabove, it is possible to determine adequately a plurality of laser power conditions that are employed in the heat-assisted magnetic recording method of the first and second aspect of the present invention.

BRIEF DESCRIPTION OF THE DRAWINGS

FIG. 3 shows the relationship between the zone type (annular area), zone range, and laser power that are set in the heat-assisted magnetic recording method in accordance with the present invention;

DESCRIPTION OF THE PREFERRED EMBODIMENTS

Figure 1:
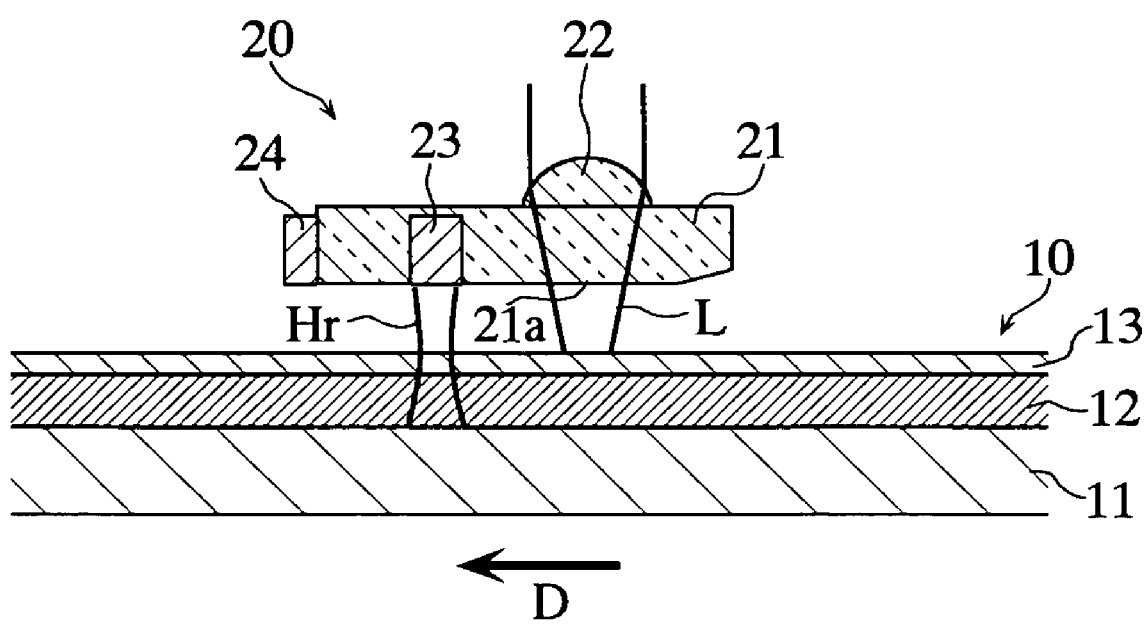
FIG. 1 shows a magnetic disk and a slider for implementing the heat-assisted magnetic recording method and test record reproduction method in accordance with the present invention.

FIG. 1 shows a magnetic disk 10 and a slider 20 capable of implementing the heat-assisted magnetic recording method and test record reproduction method of the present invention.

The magnetic disk 10 has a laminated structure comprising a disk substrate 11, a recording magnetic film 12, and a protective layer 13 and is composed as a magnetic recording medium capable of implementing information recording and information reproduction in a heat-assisted recording system. The disk substrate 11 is a component mainly designed to ensure the rigidity of the magnetic disk 10 and is, for example, an aluminum alloy substrate, a glass substrate, or a resin substrate. The recording magnetic film 12 is composed of a perpendicularly magnetized film or in-plane magnetized film and constitutes a recording surface for recording the information in the magnetic disk 10. A plurality of concentric circular tracks are magnetically composed on the recording surface. Such a recording magnetic film 12 is composed, for example, of a Co alloy, an Fe alloy, or an amorphous alloy of a rare earth transition metal. The protective layer 13 serves to protect chemically and physically the recording magnetic film 12 from the external fields. It is composed, for example, of SiN, $SiO_2$, or diamond-like carbon. If necessary, such a magnetic disk 10 may comprise other films. Such a magnetic disk 10 is supported by a spindle motor (not shown in the figure) and rotated in the direction of arrow D by a rotary drive from the spindle motor. The rotary drive of the spindle motor is controlled based on the control signals from the prescribed control unit.

The slider 20 comprises a slider body 21, a converging lens 22, a magnetic head 23 for recording, and a magnetic head 24 for reproduction. During information recording or information reproduction by the magnetic disk 10, the slider is disposed in a floating condition with respect to the magnetic disk 10. The slider body 21 has the prescribed shape such that when the linear speed of the zone in the rotating magnetic disk 10 that faces the slider 20 is above the prescribed value, an air lubricating film is formed between the slider 20 and the magnetic disk 10 or protective layer 13. Furthermore, the slider body 21 comprises a prescribed laser emission section 21a on the side thereof facing the medium. A laser beam L that was emitted from a light source (not shown in the figures) and passed through the converging lens 22 can be emitted from the laser emission section 21a. The converging lens 22 is used to converge the laser beam L. The magnetic head 23 serves to apply the prescribed recording magnetic field to the recording magnetic film 12 and is composed of a coil for passing an electric current for magnetic field generation and a magnetic pole for converting the generated magnetic field into a strong magnetic field. The magnetic head 24 serves to detect magnetic signals originating in the magnetization state of the recording magnetic film 12 and converting them into electric signals. This magnetic head for reproduction is composed, for example, of a GMR element or MR element. Such a slider 20 is linked to an actuator (not shown in the figure) via a suspension arm (not shown in the figure) in the form of a plate spring. The actuator is composed, for example, of a bias coil motor. The suspension arm serves to produce a force acting on the slider 20 in the direction of the magnetic disk 10. The actuator is composed, for example, of a voice coil motor.

Figure 2:
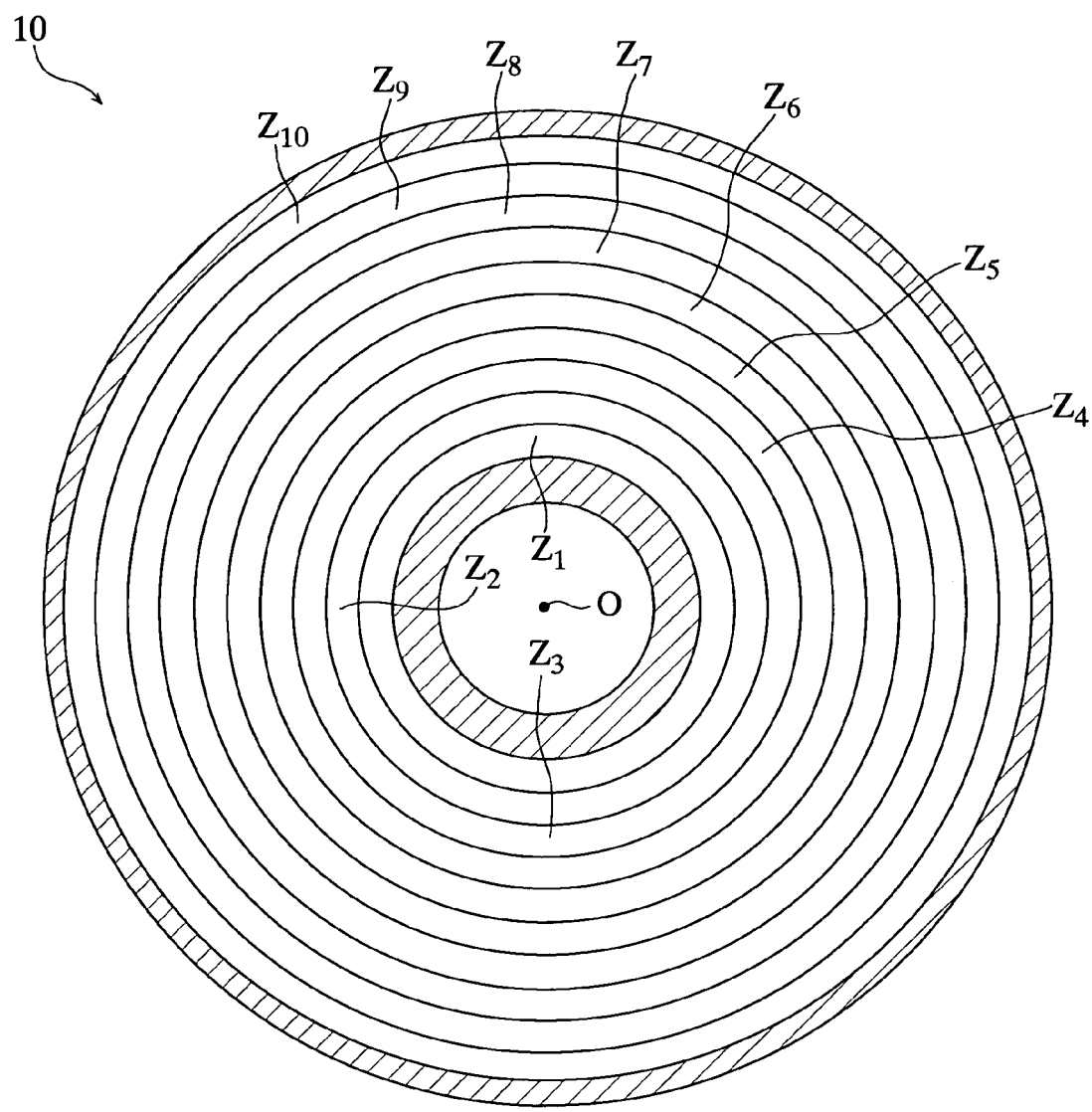
FIG. 2 shows the zone division in the recording surface of a magnetic disk.

In the heat-assisted magnetic recording method in accordance with the present invention, the recording surface (composed of the recording magnetic film 12) of the magnetic disk 10 is divided, for example, as shown in FIG. 2, into a plurality of concentric circular zones (annular areas) Z1 to Z10. Each of the zones Z1 to Z10 comprises a plurality of tracks (not shown in FIG. 2). An example of each range of the zones Z1 to Z10 is shown in FIG. 3 by a radial position on the disk (monodirectional position in the radial direction of the disk; it is a position from the rotation center O of the magnetic disk 10). Further, in the present heat-assisted magnetic recording method, as shown in FIG. 2, laser powers P1 to P10 are set for the zones Z1 to Z10. The laser powers P1 to P10 satisfy the relationship: P1<P2<P3<P4<P5<P6<P7<P8<P9<P10. The laser powers P1 to P10 are contained, for example, in a range of 1 to 10 mW.

If the linear speed (or laser beam illumination time) in the zone predetermined for recording mark formation differs according to the position of the track in the radial direction of the disk when the recording marks are formed with the heat-assisted magnetic recording method on one prescribed track, while rotating the magnetic disk 10 at a constant rotation speed, with the heat-assisted magnetic recording method in accordance with the present invention, the laser powers P1 to P10 of adequate intensity are set according to each difference in the average linear speed between the zones Z1 to Z10 so as to inhibit the difference in the maximum attained temperature of the temperature increase area of the recording magnetic film 12 caused by illumination with the laser beam L and to obtain a uniform maximum attained temperature and also to inhibit the difference in the width of the temperature increase range above the prescribed temperature and to obtain a uniform width of the temperature increase range. More specifically, because the average linear speed is lower for the zones on the inner side, a lower laser power is set for the zones further on the inner side.

During information recording with the heat-assisted magnetic recording method in accordance with the present invention, the magnetic disk 10 is rotated at a constant speed. The rotation speed is, for example, 4200-10,000 rpm. As a result, an air lubrication film is produced between the magnetic disk 10 and slider 20, and the slider 20 floats above the magnetic disk. Further, the recording surface (recording magnetic film 12) of the magnetic disk 10 is continuously illuminated with the laser beam L emitted from the laser emission section 21a through the converging lens 22 installed on the slider 20. With the present method, the aforementioned laser beam illumination is conducted after selecting the laser power P1 to P10 according to the type (zones Z1 to Z10) of the zone (zone containing the location predetermined for recording mark formation) where information recording will be implemented. Moreover, with the present method, a recording magnetic field of constant intensity is applied to the recording magnetic film 12 by the magnetic head 23 that was placed on the slider 20. The intensity of the recording magnetic field is, for example, 4-5 kOe. Furthermore, when the direction of the recording magnetic field from the magnetic head 23 is consecutively inverted in a state in which the magnetic disk 10 is rotated, a plurality of magnetic domains (recording marks) with a successively inverted magnetization direction are formed in a row in the circumferential direction of the magnetic disk 10 or track extension direction in the recording magnetic film 12. At this time, each recording mark is formed at a respective prescribed length by controlling the timing at which the direction of the recording magnetic field is inverted. The prescribed signals or information are thus recorded as changes in the magnetization direction in the recording magnetic film 12.

With the present heat-assisted magnetic recording method, laser illumination is conducted by selecting the appropriate laser power P1 to P10 correspondingly to the type (zones Z1 to Z10) of the zone predetermined for laser beam illumination (zone predetermined for recording mark formation) in the recording magnetic film 12, thereby making it possible to inhibit the difference in the maximum attained temperature in the temperature increase areas of the recording magnetic film 12 during information recording and to obtain a uniform maximum attained temperature and also to inhibit the difference in the width of the temperature increase range above the prescribed temperature and to obtain a uniform width of the temperature increase range over the region from the outermost zone Z10 to the innermost zone Z1 of the recording magnetic film 12. Moreover, obtaining a uniform temperature increase range above the prescribed temperature at an adequate width level makes it possible to avoid or sufficiently inhibit the above-described cross-write effect caused by the inappropriate widening of the temperature increase range above the prescribed temperature. Therefore, with this heat-assisted magnetic recording method, the recording marks can be adequately formed, while avoiding or sufficiently inhibiting the recording demagnetization or cross-write effect. Such a heat-assisted magnetic recording method is suitable for increasing the density of recording on magnetic recording media.

In the heat-assisted magnetic recording method, increasing the number of zones into which the recording surface of the magnetic disk 10 is divided and increasing the number of laser power levels that are to be set are advantageous in terms of increasing the uniformity of maximum attained temperature by further inhibiting the difference in the maximum attained temperature of the temperature increase areas of the recording magnetic film 12 during information recording and in terms of increasing the uniformity of the width of the temperature increase range by further inhibiting the difference in the width of the temperature increase range above the preset temperature.

Figure 4:
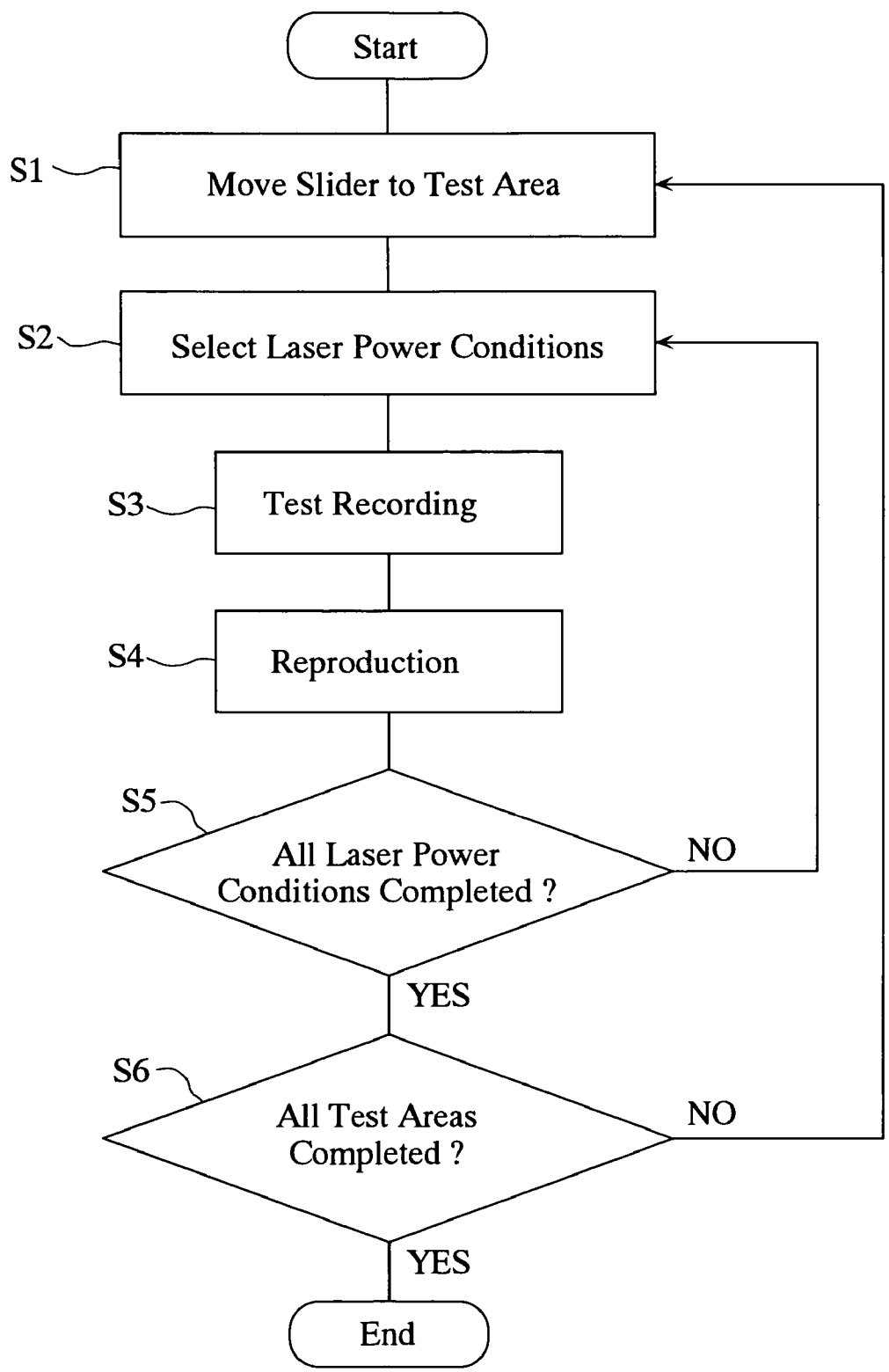
FIG. 4 is a flow chart of the first test record reproduction method in accordance with the present invention.
Figure 5:
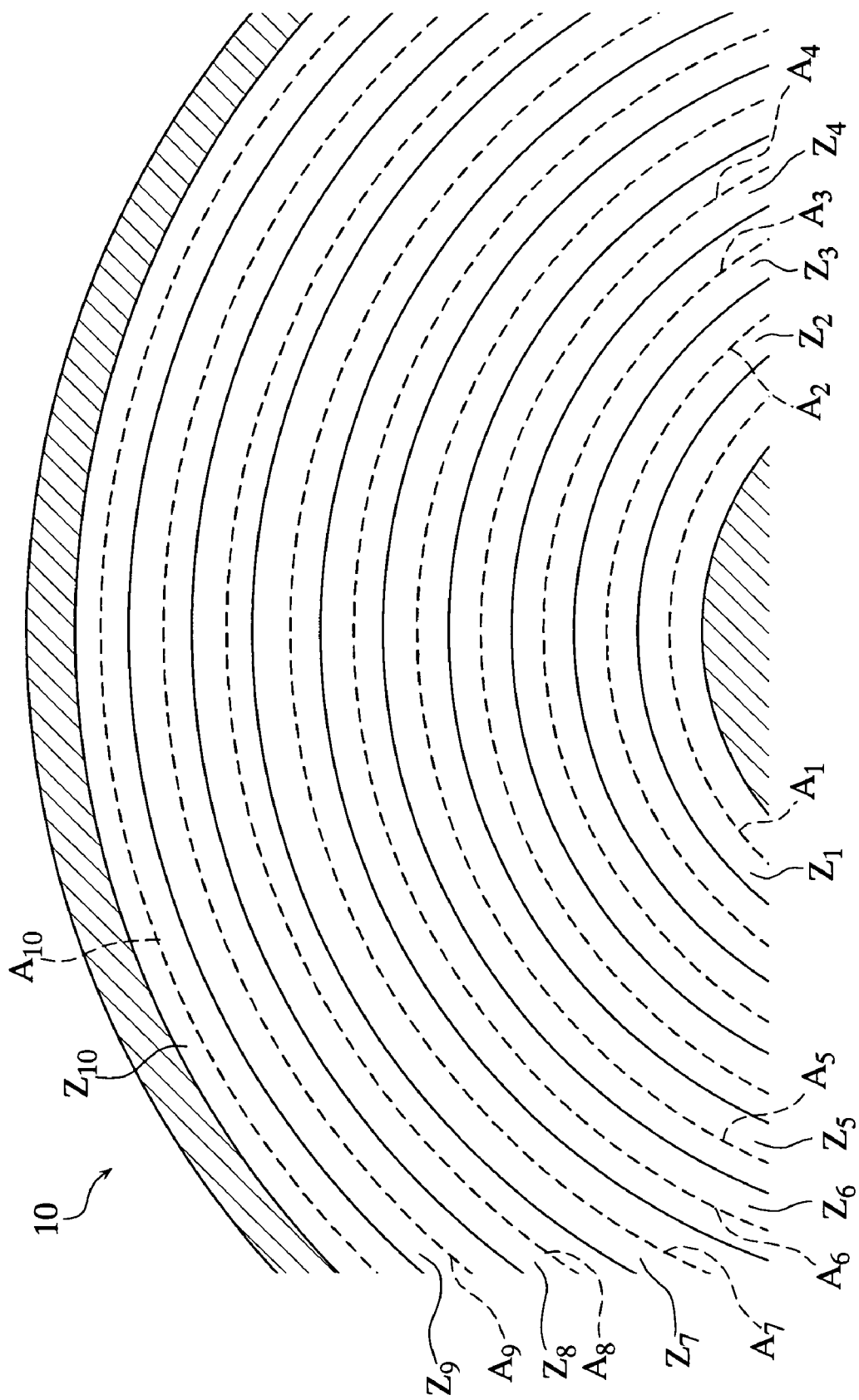
FIG. 5 shows a test area in the first test record reproduction method.
Figure 6:
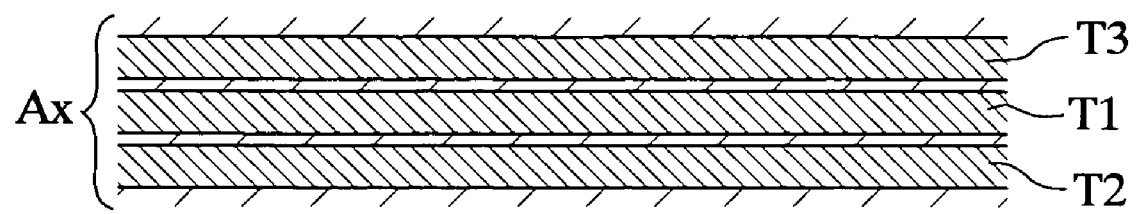
FIG. 6 is a partial enlarged view of one test area.

FIG. 4 is a flow chart of the first test record reproduction method for determining the laser power conditions (laser power P1 to P10) employed in the above-described heat-assisted magnetic recording method. In the present test record reproduction method, the test areas A1 to A10 are set, as shown in FIG. 5, in the zones Z1 to Z10, respectively, in the recording surface (recording magnetic film 12) of the magnetic disk 10. A total of three tracks T1 to T3 are contained in each of the test areas A1 to A10, as shown in FIG. 6. The track T1 in the present method is located in the center in the radial direction of the disk in each of the zones Z1 to Z10. Thus, the position of the track T1 in the radial direction of the disk is an average position in the radial direction of the disk in each zone Z1 to Z10. Further, a plurality of laser power conditions are correspondingly preset for each test area A1 to A10. A plurality of laser power conditions for each test area are set, for example, within a range of 1 to 10 mW, and identical sets of laser power conditions may be set for all the test areas A1 to A10. Alternatively, different sets of laser power conditions may be set for different test areas.

With the present test record reproduction method, first, in step S1, a slider 20 is moved by driving from an actuator on the track T1 of the prescribed test area Ax selected from the test areas A1 to A10.

Then, in step S2, the power of the illumination laser beam L in the next test recording process is selected. More specifically, a laser power Px is selected from a plurality of laser powers that have been preset for the test area Ax.

Then, in step S3, a test recording process is executed under a condition of laser power Px in the test area Ax. More specifically, first, the magnetic disk 10 is rotated at a prescribed fixed speed and the slider 20 id disposed in a floating state above the magnetic disk 10. In this state, the track T1 is illuminated with a laser beam L with a laser power Px, thereby locally and successively raising the temperature of the track T1. In this process, a recording magnetic field Hr of the prescribed intensity and prescribed frequency is applied to the temperature increase area, thereby forming a first recording mark group over the circumference of the track T1. The rotation speed of the magnetic disk 10 is set to be equal to the rotation speed in the above-described heat-assisted magnetic recording method through the present test record reproduction method. The first recording mark group is composed of recording marks of a constant mark length with a linear recording density of, for example, 800 kFCI. After the first recording mark group has thus been formed on the track T1, in a state in which the magnetic disk 10 is rotated at the same speed and the slider 20 is disposed above the magnetic disk 10, the track T2 adjacent to the track T1 is illuminated with the laser beam L of a laser power Px, thereby locally and successively raising the temperature of the track T2. In this process, a recording magnetic field Hr of the prescribed intensity and prescribed frequency is applied to the temperature increase area, thereby forming a second recording mark group over the circumference of the track T2. Then, a third recording mark group is formed over the circumference of the track T3, similarly to the formation of the second recording mark group. The second and third recording mark groups are composed of recording marks of a constant mark length with a linear recording density of, for example, 100 kFCI. The test recording process is executed in the above-described manner under a condition of laser power Px in the test area Ax.

Then, in step S4, a reproduction process is executed with respect to the track T1 of the test area Ax that was subjected to the above-described test recording process. More specifically, as described hereinabove, a magnetic signal originating from the first recording mark group is measured with the magnetic head 24 of the slider 20 with respect to the track T1 of the test area Ax where the first recording mark group was formed in the above-described manner. Then, in the present step, the measured magnetic signal is compared with the magnetic signal during recording (during the formation of the first recording mark group), and an error ratio of the magnetic signal during reproduction with respect to the magnetic signal during recording is found as a bit error rate (bER). After the magnetic signal originating from the first recording mark group has been measured, the first to third recording mark groups of the tracks T1 to T3 are deleted.

The processing flow returns from the step S5 to the step S2 and steps S3 and S4 are repeated with respect to the test area Ax selected from the test areas A1 to A10 till the above-described steps S3 and S4 are executed for all of a plurality of laser power conditions that were set for the test area Ax. The bER is thus found with respect to the test area Ax for all the laser power conditions that were set. Further, the laser power conditions for which the bER with the lowest value was obtained among a plurality of bER that were found for each laser power condition with respect to one test area Ax is determined as the optimum laser power condition in the test area Ax. The minimum bER means that the laser power condition for which the minimum bER was obtained is optimum from the standpoint of inhibiting the recording demagnetization effect and/or cross-write effect, among a plurality of laser power conditions that have been set for the test area Ax. The processing flow then proceeds from step S5 to step S6.

The processing flow in step S6 returns to step S1 and steps S2 to S5 are repeated till the determination of the optimum laser power conditions with respect to one test area Ax is conducted through the steps S2 to S5 for all of a plurality of test areas A1 to A10. The optimum laser power conditions can thus be determined for all the test areas A1 to A10.

The set of determined optimum laser power conditions can be employed as the laser power conditions (laser power P1 to P10) set with respect to the zones Z1 to Z10 in the above-described heat-assisted magnetic recording method. Further, in the above-described test record reproduction method, since the linear speed differs for each track T1 of the test area A1 to A10, the optimum laser power conditions relating to each test area A1 to A10 are equivalent to optimum laser power conditions relating to each linear speed.

Figure 7:
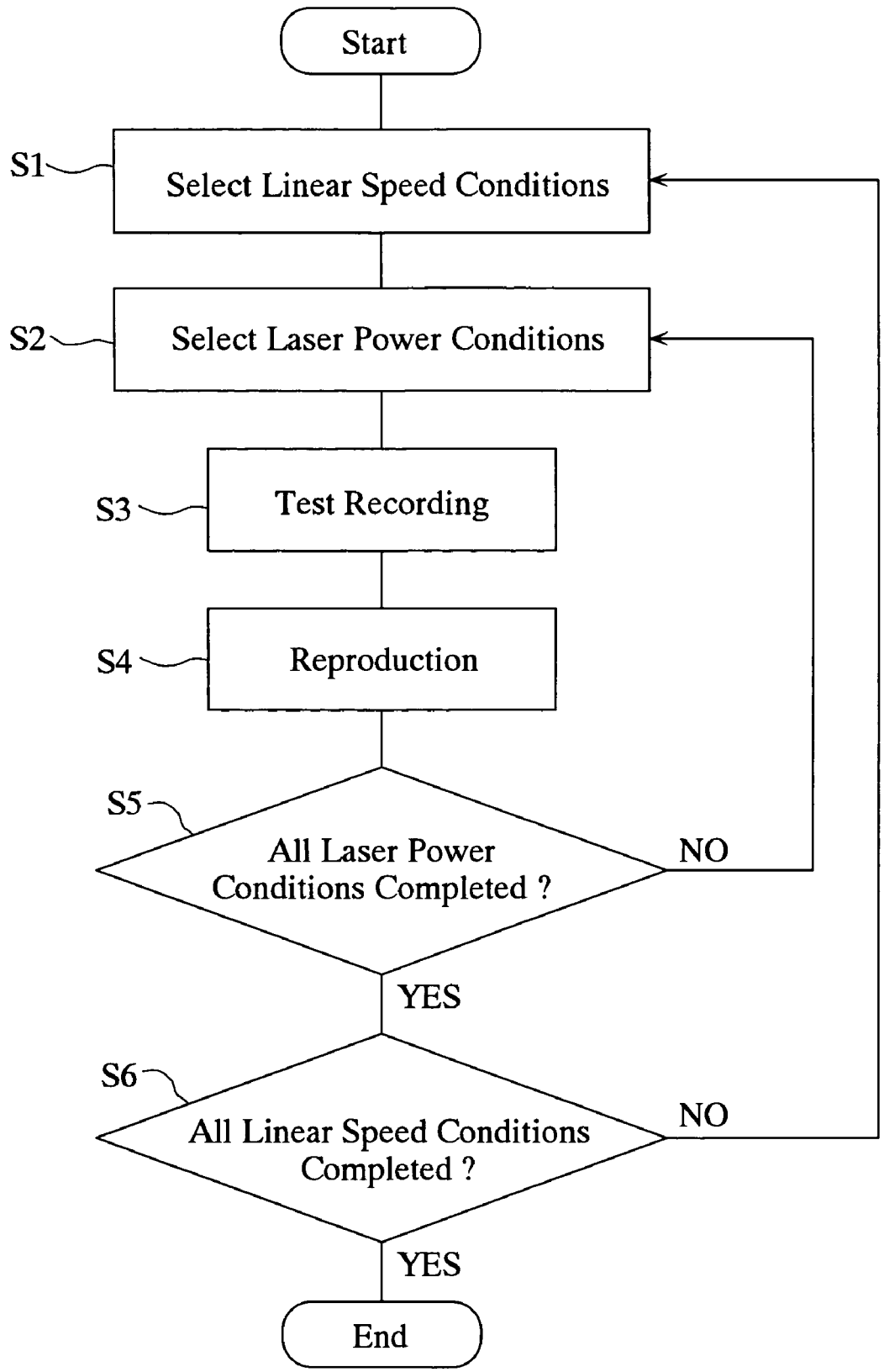
FIG. 7 is a flow chart of the second test record reproduction method in accordance with the present invention.
Figure 8:
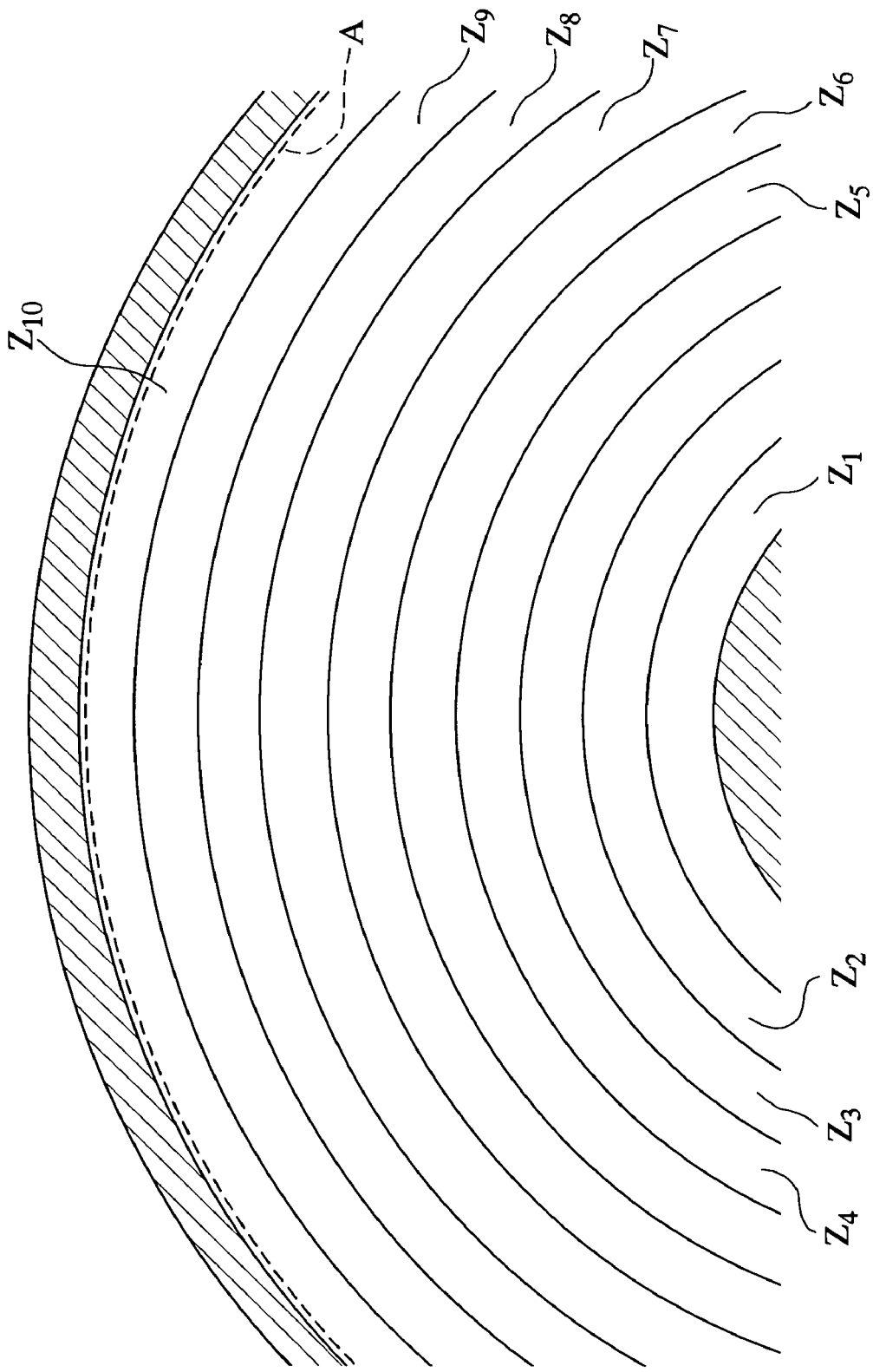
FIG. 8 shows a test area in the second test record reproduction method.

FIG. 7 is a flow chart of the second test record reproduction method for determining the laser power conditions (laser power P1 to P10) employed in the above-described heat-assisted magnetic recording method. In the present test record reproduction method, the test area A is set, as shown in FIG. 8, on the outermost periphery of the zone Z10 in the recording surface (recording magnetic film 12) of the magnetic disk 10 and the below-described test recording process or reproduction process are executed in this test area A. In the test area A, as shown in FIG. 6, a total of three tracks T1 to T3 are contained. With the present method, ten rotation speeds are set for the magnetic disk 10 so that ten different linear speeds R1 to R10 are realized for the track T1. The aforementioned ten linear speeds R1 to R10 relating to the track T1 are the ten linear speeds R1 to R10 (average linear speeds of zones Z1 to Z10) in the average positions of the zones Z1 to Z10 in the radial direction of the disk obtained in the case where the rotation speed of the magnetic disk 10 was set equal to the rotation speed in the above-described heat-assisted magnetic recording method. Furthermore, a plurality of laser power conditions are correspondingly set in advance for the linear speeds R1 to R10 of the track T1. A plurality of laser power conditions for each linear speed are set, for example, within a range of 1 to 10 mW, within a range of 1 to 10 mW, and identical sets of laser power conditions may be set for all the linear speeds R1 to R10. Alternatively, different sets of laser power conditions may be set for different linear speeds.

With the present test record reproduction method, first, in step S1, the linear speed Rx of the track T1 in the below-described test recording process is selected from the linear speeds R1 to R10.

Then, in step S2, the power of the illumination laser beam L in the next test recording process is selected. More specifically, a laser power Px is selected from a plurality of laser powers that have been preset for the linear speed Rx.

Then, in step S3, a test recording process is executed under a condition of laser power Px and linear speed Rx in the test area A. More specifically, first, the magnetic disk 10 is rotated at a prescribed fixed speed, so that the linear speed of the track T1 becomes the linear speed Rx, and the slider 20 is disposed in a floating state above the magnetic disk 10. In this state, the track T1 is illuminated with a laser beam L with a laser power Px, thereby locally and successively raising the temperature of the track T1. In this process, a recording magnetic field Hr of the prescribed intensity and prescribed frequency is applied to the temperature increase area, thereby forming a first recording mark group over the circumference of the track T1. The first recording mark group is composed of recording marks of a constant mark length with a linear recording density of, for example, 800 kFCI. After the first recording mark group has thus been formed on the track T1, in a state in which the magnetic disk 10 is rotated at the same speed and the slider 20 is disposed above the magnetic disk 10, the track T2 adjacent to the track T1 is illuminated with the laser beam L of a laser power Px, thereby locally and successively raising the temperature of the track T2. In this process, a recording magnetic field Hr of the prescribed intensity and prescribed frequency is applied to the temperature increase area, thereby forming a second recording mark group over the circumference of the track T2. Then, a third recording mark group is formed over the circumference of the track T3, similarly to the formation of the second recording mark group. The second and third recording mark groups are composed of recording marks of a constant mark length with a linear recording density of, for example, 100 kFCI. The test recording process is executed in the above-described manner under a condition of the linear speed Rx and laser power Px.

Then, in step S4, a reproduction process is executed with respect to the track T1 of the test area A that was subjected to the above-described test recording process. More specifically, as described hereinabove, a magnetic signal originating from the first recording mark group is measured with the magnetic head 24 of the slider 20 with respect to the track T1 of the test area A where the first recording mark group was formed in the above-described manner. Then, in the present step, the measured magnetic signal is compared with the magnetic signal during recording (during formation of the first recording mark group), and an error ratio of the magnetic signal during reproduction with respect to the magnetic signal during recording is found as a bit error rate (bER). After the magnetic signal originating from the first recording mark group has been measured, the first to third recording mark groups of the tracks T1 to T3 are deleted.

The processing flow returns from the step S5 to the step S2 and steps S3 and S4 are repeated with respect to one linear speed Rx selected from the linear speeds R1 to R10, till the above-described steps S3 and S4 are executed for all of a plurality of laser power conditions that were set for the linear speed Rx. The bER is thus found with respect to the linear speed Rx for all the laser power conditions that were set. Further, the laser power conditions for which the bER with the lowest value was obtained among a plurality of bER that were found for each laser power condition with respect to one linear speed Rx is determined as the optimum laser power condition at the linear speed Rx. The minimum bER means that the laser power condition for which the minimum bER was obtained is optimum from the standpoint of inhibiting the recording demagnetization effect and/or cross-write effect, among a plurality of laser power conditions that have been set for the linear speed Rx. The processing flow then proceeds from step S5 to step S6.

The processing flow in step S6 returns to step S1 and steps S2 to S5 are repeated till the determination of the optimum laser power conditions with respect to one linear speed Rx is conducted through the steps S2 to S5 for all of a plurality of linear speeds R1 to R10. The optimum laser power conditions can thus be determined for all the linear speeds R1 to R10.

The set of determined optimum laser power conditions can be employed as the laser power conditions (laser power P1 to P10) set with respect to the zones Z1 to Z10 in the above-described heat-assisted magnetic recording method. With the present method, a plurality of optimum laser power conditions can be determined by using only one test area A. Therefore, this method is preferred from the standpoint of increasing the capacity of the magnetic disk 10.

In step 3 (test recording process) of the above-described first and second test record reproduction method, all the marks of the first to third recording marc groups were formed on the track circumference. However, the track circumference may be divided into a plurality of sections and a plurality of test recording processes may be executed at the same time on the track circumference by changing the test recording conditions (laser power or linear speed) for each section. When such a method is employed, a plurality of reproduction processes corresponding to the plurality of test recording processes can be executed at the same time after the plurality of test recording processes. Such a method is preferred because it increases the efficiency of the test record reproduction method.

Further, in step S4 of the above-described first and second test record reproduction method, bER was used when the optimum laser power was determined. However, a reproduction signal amplitude may be used instead of the bER. More specifically, with the method using the reproduction signal amplitude, the reproduction signal amplitude under all the laser power conditions that were set is measured for the test area Ax or linear speed Rx, and a laser power condition for which the largest reproduction signal amplitude was obtained among a plurality of reproduction signal amplitudes measured for each laser power conduction with respect to one test area Ax or linear speed Rx is determined as the optimum laser power condition at this test area Ax or linear speed Rx. The largest reproduction signal amplitude means that the laser power condition for which the largest reproduction signal amplitude was obtained is optimum from the standpoint of inhibiting the recording demagnetization effect and/or cross-write effect, among a plurality of laser power conditions that have been set for the test area Ax or linear speed Rx.

The invention claimed is:

1. A heat-assisted magnetic recording method for implementing information recording on a recording magnetic film of a magnetic recording medium rotated around a rotation center, the method comprising:
    illuminating a plurality of recording regions in the magnetic film with a laser beam for locally heating each of the recording regions; and
    applying a recording magnetic field to each of the heated recording regions;
    wherein the laser beam illuminating the recording regions is varied in power in accordance with a distance that varies between the rotation center and each of the recording regions; and
    wherein each of the recording regions comprises a plurality of recording tracks, the laser beam illuminating the plurality of recording tracks in each same recording region is kept constant in power.

2. The heat-assisted magnetic recording method according to claim 1, wherein the recording magnetic film comprises a plurality of concentric annulus regions having a common center coinciding with the rotation center, and wherein the power of the laser beam is selected depending on which annulus region the recording region belongs to.

3. The heat-assisted magnetic recording method according to claim 2, wherein the plurality of concentric annulus regions include a first annulus region and a second annulus region that is farther from the rotation center than the first annulus region is, and wherein the power of the laser beam is lower for illuminating the first annulus region than for illuminating the second annulus region.

* * * * *